United States Patent [19]
Frank et al.

[11] 3,990,829
[45] Nov. 9, 1976

[54] ORIENTED CRYSTALLIZATION OF POLYMERS

[76] Inventors: Frederick Charles Frank, Orchard Cottage, Grove Road, Coombe Dingle; Andrew Keller, 41 Westbury Road, Westbury-on-Trym, both of Bristol 9; Malcolm Robert Mackley, Springfield Cottage, Richmond Dale, Clifton, Bristol 8, all of England

[22] Filed: June 19, 1974

[21] Appl. No.: 480,938

[30] Foreign Application Priority Data
June 26, 1972  United Kingdom............... 29840/72

[52] U.S. Cl........................ 425/376 R; 264/176 F; 425/460
[51] Int. Cl.² .......................................... B29F 3/06
[58] Field of Search ............ 425/376, 380, 72, 68, 425/378, 382 R, 382.2, 461–467; 264/176 F

[56] References Cited
UNITED STATES PATENTS

| | | |
|---|---|---|
| 1,012,232 | 12/1911 | Balg................................ 425/462 X |
| 1,999,926 | 4/1935 | Garzia................................ 425/380 |
| 3,540,080 | 11/1970 | Goossens...................... 425/382.2 X |
| 3,618,166 | 11/1971 | Ando et al........................... 425/462 |
| 3,752,614 | 8/1973 | Bremer....................... 425/466 X |

*Primary Examiner*—Robert L. Spicer, Jr.
*Attorney, Agent, or Firm*—Larson, Taylor & Hinds

[57] ABSTRACT

Molten crystallizable polymer is extruded through an orifice. Opposite the orifice on the upstream side is a fixed surface arranged so as to provide in the molten polymer a line of uniaxial extension or a plane of pure shear passing through the orifice. The polymer is extruded at a temperature and flow rate such as to cause a core of crystalline polymer to form in the melt along said line or plane. It is particularly suitable for extruding a continuous filament having a highly crystalline core in a generally less crystalline matrix of the polymer.

8 Claims, 5 Drawing Figures

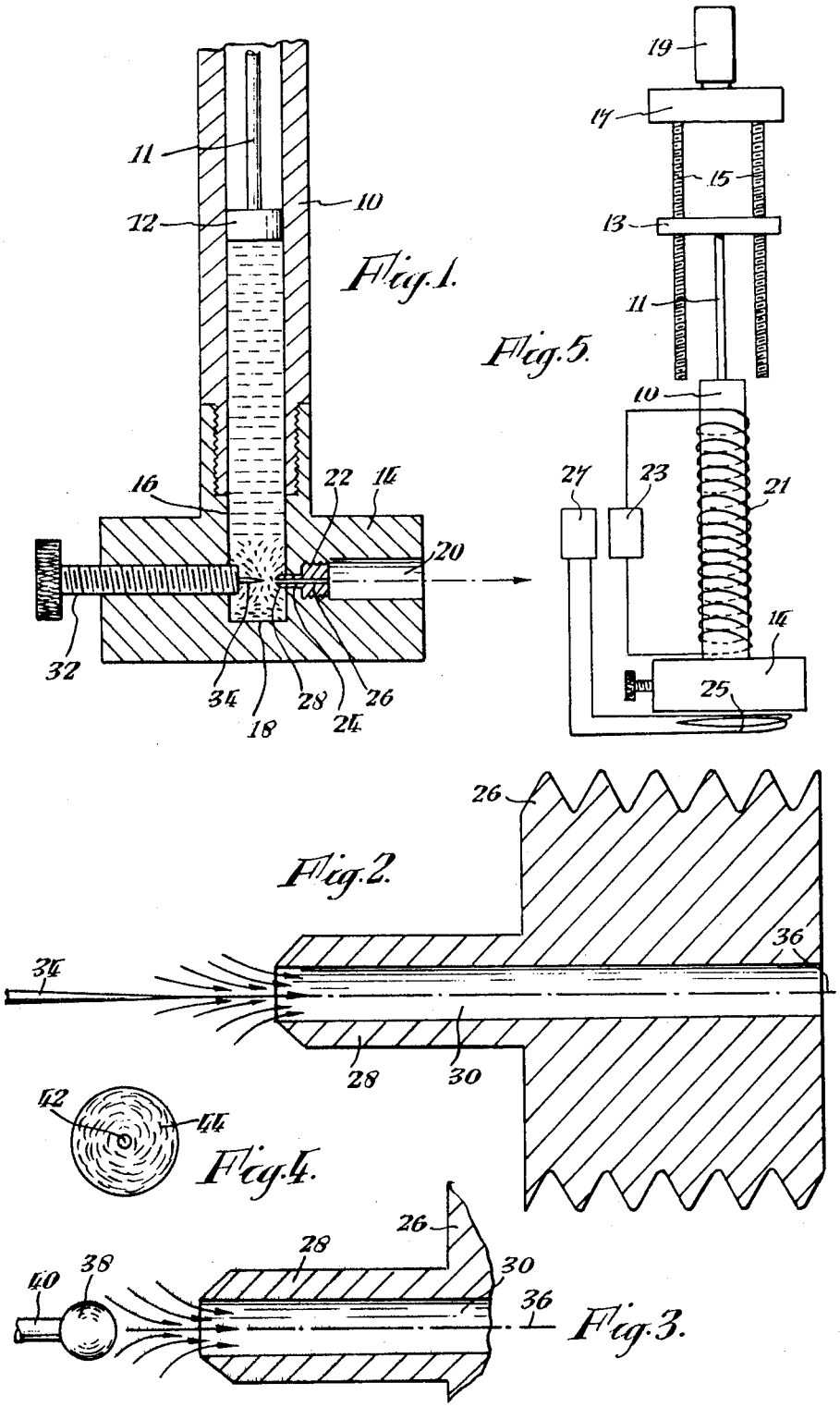

ORIENTED CRYSTALLIZATION OF POLYMERS

This invention relates to the production of oriented crystallization in polymer melts, and is especially applicable to the production of highly oriented polymer filaments.

The usual method at present for producing an oriented polymer filament is to extrude molten polymer through an orifice and wind up the crystallized filament so produced at a rate faster than the extrusion velocity. This stretches the filament and produces orientation of the molecules in the extruded polymer as it crystallizes. It is known that this orientation is due to alignment of chain molecules. However, in the usual fibre this alignment is low, and does not produce a very high Young's Modulus. It is thought that in order to obtain a higher Modulus it is necessary to produce a high degree of orientation with a significant proportion of the polymer molecules in an extended chain orientation, that is with substantially straight molecules extending longitudinally along the filament. To obtain high molecular extensions, high longitudinal velocity gradients in the molten polymer are thought to be required. This is difficult to achieve in conventional filament extrusion processes, where maximum obtainable velocity gradients are usually of the order of 20 sec$^{-1}$.

The present inventors have discovered that if molten crystallizable polymer is forced through a constricted orifice of a geometry which produces a sufficiently high velocity gradient in the polymer in the region of the orifice along a line of uniaxial extension or a plane of pure shear, the temperature and flow rate can be selected so as to provide continuous production of a core of crystalline polymer within the melt emerging from the orifice.

According to one aspect of the present invention there is provided apparatus for extruding molten polymer, comprising a chamber for molten crystallizable polymer, the chamber having a restricted outlet orifice for the polymer, means for applying desired pressure to the polymer to force it through the orifice, and a fixed surface within the chamber facing the orifice and on the axis thereof adapted to provide in the molten polymer a line of uniaxial extension or a plane of pure shear passing through the orifice.

According to another aspect of the present invention there is provided a process which comprises forcing a molten crystallizable polymer through a restricted orifice in the above apparatus, under conditions of flow rate and temperature which cause the production of a core of crystalline polymer to be formed in the region of the line of uniaxial extension or plane of pure shear in the melt being extruded.

A third aspect of the invention provides a polymer extrudate comprising a linear or planar core of highly oriented and stable crystalline polymer within a matrix of the same polymer which is at least partly in a less oriented and stable crystalline form, produced by the above method.

In order that the invention may be more clearly understood, one embodiment will now be described with reference to the accompanying diagrammatic drawings, wherein:

FIG. 1 shows a cross-sectional side view through apparatus for carrying out the process, FIG. 2 is an enlarged cross-sectional view of the orifice region of the apparatus of FIG. 1, FIG. 3 is a view, similar to FIG. 2, but using a ball in place of a pin, FIG. 4 is a diagrammatic enlarged cross-sectional view through the polymer extrudate, and FIG. 5 shows diagrammatically the manner in which the temperature and flow rate is controlled in the apparatus of FIG. 1.

Referring to the drawing, and firstly to FIGS. 1 and 2; fitted to the lower end of a barrel 10 and piston 12 is a block 14 which is provided with a cylindrical chamber 16 which forms a continuation of the barrel and is closed at its lower end 18. A bore 20 extends into the block 14 radially with respect to the chamber 16. At its inner end the bore 20 has a short screw-threaded region 22, and is then stepped down to a much narrower bore 24 which communicates radially with the chamber 16. An externally threaded plug 26 is screwed into the bore 22, and a spigot 28 on the plug projects through the narrower bore 24 radially into the chamber 16. A passage 30 of uniform cross-section extends through the spigot 28 and plug 26 so as to present a nozzle in the chamber 16 at the end of the spigot. Diametrically opposite the bore 20, an internally threaded bore in the block 14 receives a screw 32. At its inner end the screw carries an axially mounted needle 34 which is pointed towards the nozzle of the spigot 28 along the axis 36 of the passage 30. The point of the needle can be moved towards or away from the nozzle along the axis 36 by rotating the screw 32.

The barrel 10 is enclosed in a suitable adjustable constant temperature device, and the piston is connected to drive means adapted to give an adjustable constant rate of advance down the barrel. This is suitably effected as shown in FIG. 5. The rod 11 of the piston 12 is connected to a crosshead 13 which is carried on a pair of screw-threaded spindles 15. At their upper end the spindles 15 emerge from a gear box 17 through which they are driven at a variable speed by means of an electric motor 19. Thus, by varying the rate of rotation of the screw-threaded spindles 15, the rate of descent of the cross-head 13, and therefore of the piston 12, is determined. This in turn determines the rate of extrusion through the passage 30 of the nozzle. The temperature is separately controlled in the barrel 10 and block 14. An electric heating coil 21 is wound around the barrel, and its temperature is controlled to within ½° C by a conventional temperature controller 23. A second heating coil 25 is secured in thermal contact with the undersurface of the block 14, which is made of material of good thermal conductivity, and its temperature is similarly controlled by means of a conventional temperature controller 27.

In operation the barrel is charged with polymer and brought to the required temperature. When equilibrium is reached, the piston is advanced at a predetermined rate down the barrel. This forces the polymer out through the nozzle orifice at a known temperature and flow rate; the flow rate being of course determined for a given orifice geometry and piston size by the rate of advance of the piston. The polymer between the point of the needle 34 and the orifice can, if desired, be observed, e.g. between crossed polars or in bright field, through windows provided in the sides of the chamber 16, and the extruded filament 38 can be continuously removed from the passage 20 and wound up. Samples of the filament can be examined, e.g. by X-ray diffraction, microscopic examination of the cross-section of the extrudate, and differential scanning calorimetry.

The molten polymer under pressure flows symmetrically into the space between the needle point and nozzle before entering the nozzle orifice. The axis 36 of the nozzle will therefore be the symmetry axis with respect to the flow, and a condition of uniaxial extension will arise along that axis from zero velocity at the surface of the needle point to maximum velocity on entering the orifice. Under suitable operating conditions, crystallization occurs in the melt along this line. In addition, nucleation can also occur, under suitable conditions, in the region around the symmetry axis. In general, however, nucleation occurs preferentially along the axis under uniaxial extension.

In FIG. 3, there is shown a modification in which the needle 34 is replaced by a ball 38 mounted on an axially extending rod 40 carried by the screw 32. This gives a slightly different shape to the flow pattern in the polymer entering the orifice, but there still remains a line of uniaxial extension along the axis 36, since the polymer velocity will be zero at the surface of the ball 38 intersected by the axis 36, and will be at a maximum on entering the orifice.

Particular experiments were carried out using high density polyethylene (Marlex 6002 — Phillips Trade Mark) as the polymer. The needle and ball arrangements were tested separately. The needle was 0.4 mm diameter tapering to a point over a distance of 1 cm, while the ball was a steel ball of 1 mm diameter. In each case the distance of the ball or pin from the orifice was variable up to 3 mm. The orifice diameter was 1 mm, and to obtain the necessary resistance to flow, the passage 30 was made 1 cm in length. The rate of piston advance was adjusted so as to give an axial flow rate into the orifice of between 1 and 5 cm/sec. The temperature of the polymer was varied between 132° and 140° C. The extrudate was removed as a continuous filament and examined.

Optical sections of the extrudate showed, as shown in FIG. 4, a relatively small hard core 42 surrounded by a relatively soft matrix of normally crystallized polymer. The core was found to melt at between 5° and 7° C above that of the matrix; the matrix melting at about 133° to 135° C. On testing the mechanical properties, the extrudate was found to undergo brittle fracture at about 10% strain, and did not neck like normal polymers. The Modulus to fracture was up to 33Kbar. X-ray diffraction analysis gave a two-phase pattern, one component highly oriented and the other component not so well oriented. As between the needle and the ball, the needle arrangement appeared to be a marginal improvement over that of the ball.

The likely interpretation of the two-phase nature of the extrudate is that the core fibre is produced within the melt by the crystallization of longitudinally aligned extended chain molecules along the axis of uniaxial extension, and in the region of that axis. As the molecules are aligned in this highly oriented manner, the polymer material at this point acquires a higher melting point than the mass of surrounding material, and therefore crystallizes as a fibril within the melt. This fibril is continuously produced as the end moves with a high velocity gradient through the nozzle orifice, the highest velocity occurring on the axis of uniaxial extension. The polymer material extruded through the orifice around this core is probably of conventional folded chain structure and crystallizes around the core after extrusion.

It is suspected that the identity of the central core can be partially lost as it emerges from the passage 30. However, by maintaining slight tension on the fibril as it emerges it is possible to maintain the identity of the central thread completely, and thereby to produce a continuous filament consisting of a highly oriented core of suspected extended chain structure with a surrounding sheath of less oriented folded chain structure.

In the foregoing system, the polymer will have virtually zero axial velocity at the fixed surface of the point of the needle or the surface of the ball, so that the velocity gradient is given by the velocity of the polymer entering the orifice along the axis divided by the distance between the needle point and the orifice, and a condition of uniaxial extension must exist along this axis. The velocity gradient may be varied either by altering the polymer flow rate or the distance between the needle point and orifice, or both. By adjustment of flow rate, temperature, nozzle configuration and molecular weight of the melt, optimum properties for the filament can be achieved.

It should be clearly understood that the present invention differs from conventional processes of extrusion, fibre spinning and polymer orientation. In conventional extrusion, the entire polymer is molten until well after extrusion, when it is quenched and crystallizes altogether. There is no separate early crystallization within the melt. In fibre spinning it is known that reducing the temperature of the melt can result in crystallization in the orifice, so that the polymer blocks or comes out in a non-uniform filament. There is still no controlled early crystallization of a component with higher orientation than the mass of the polymer. Polymer orientation can occur, for example, in injection moulding, owing to the flow of the polymer in the mould, or in extrusion of the type indicated above. Here again, there is no early crystallization along a defined axis within a matrix of molten polymer.

In carrying out the invention, there are four principal variables to be considered; pressure, flow rate, temperature and geometry. Of these, the first three are related, in that the flow rate varies with the pressure and the temperature. It will be apparent that achieving a high flow rate is the primary concern so that the extensional flow element is high. The flow rate is only limited in theory by the occurrence of turbulence. The ability to induce crystallization is aided by high pressure and low temperature. Too high a pressure or too low a temperature, however, causes the mass of the melt to start solidifying prior to or during extrusion, resulting in blocking. The temperature is preferably carefully controlled just above the normal melting point of the polymer. The geometry of the orifice and its associated parts should be such as to produce the desired line of uniaxial extension for plane of pure shear (as opposed to simple shear). As well as the length of the extension of shear path, the velocity gradient for a given pressure will be determined by the size of the orifice, the length of the passage 30, and the viscosity of the polymer melt. In practice a long passage is to be avoided as the polymer will be in a state of simple shear within the tube which will tend to destroy the identity of the crystalline core. On the other hand, a very short passage often cannot produce the required resistance to flow. Uniaxial extension is generally preferred, being produced where there is a suitable symmetry axis associated with the orifice. Where there is a suitable plane of symmetry, instead of an axis, this can produce a plane of pure shear along which crystallization occurs. This pure shear can be obtained by using a slit instead of a circular orifice. For example, FIG. 2 could be regarded, not as a needle pointing towards a circular orifice, but as a cross-section through a sharp blade 34 pointing towards a slot 30, the median plane of which is represented at 36. Such apparatus and process would produce a laminated extruded film with a highly crystalline oriented middle ply.

The foregoing description and drawings are merely illustrative of the present invention. The extrusion can be carried out, for example, from a gravity melter, screw pressure melter, screw extruder, or other conventional equipment. The apparatus may be provided with a number of outlet orifices, so that multi-filament extrusion can be effected. Though exemplified with respect to the extrusion of polyethylene, the invention is not limited thereto, and is applicable to other polyolefins and to other crystalline thermoplastic polymers such as polyamides and polyesters.

We claim:

1. Extrusion apparatus comprising a chamber for molten crystallisable polymer, a restricted circular extrusion orifice for the polymer, means for applying pressure to the polymer to force it through the orifice, and means in the form of an element fixed within the chamber and projecting toward the extrusion orifice, but spaced therefrom, and symmetrical about a point of closest approach of said element to the orifice, for providing in molten polymer flowing into the extrusion orifice a condition of uniaxial extension along the axis of the circular orifice from said point on the projecting element, said element comprising a needle pointing toward the orifice and extending along the axis thereof.

2. Apparatus according to claim 1 wherein said element is adjustable towards and away from the orifice.

3. Extrusion apparatus comprising a chamber for molten crystallisable polymer, a restricted circular extrusion orifice for the polymer, means for applying pressure to the polymer to force it through the orifice, and means in the form of an element fixed within the chamber and projecting toward the extrusion orifice, but spaced therefrom, and symmetrical about a point of closest approach of said element to the orifice, for providing in molten polymer flowing into the extrusion orifice a condition of uniaxial extension along the axis of the circular orifice from said point on the projecting element, said element having substantially spherical curvature, and its center of curvature lying on the axis of the orifice.

4. Apparatus according to claim 3 wherein said element is adjustable toward and away from the orifice.

5. A process for extruding a continuous filament of polymeric material which comprises forcing a molten crystallizable polymer through the circular outlet orifice in apparatus of claim 1 under conditions of flow rate and temperature which cause the production of a core of crystalline polymer to be formed in the region of the line of uniaxial extension in the melt being extruded.

6. A process according to claim 5 wherein the polymeric material is high density polyethylene, the melt temperature being from 132° to 140° C, the axial flow rate at the orifice is from 1 to 5 cm/sec. and said element is located up to 3 mm from the orifice.

7. A process for extruding a continuous filament of polymeric material which comprises forcing a molten crystallisable polymer through the circular outlet orifice in apparatus as claimed in claim 3 under conditions of flow rate and temperature which cause the production of a core of crystalline polymer to be formed in the region of the line of uniaxial extension in the melt being extruded.

8. A process according to claim 7 wherein the polymeric material is high density polyethylene, the melt temperature being from 132° to 140° C, the axial flow rate at the orifice is from 1 to 5 cm/sec. and said element is located up to 3mm from the orifice.

* * * * *

PO-1050
(5/69)

UNITED STATES PATENT OFFICE
CERTIFICATE OF CORRECTION

Patent No. 3,990,829      Dated November 9, 1976

Inventor(s) Frederick C. FRANK, Andrew KELLER and Malcolm R. MACKLEY

It is certified that error appears in the above-identified patent and that said Letters Patent are hereby corrected as shown below:

On the first page of the specification, under "Foreign Application Priority Data", the date of June 26, 1972, is changed to June 26, 1973.

Signed and Sealed this

Twenty-second Day of March 1977

[SEAL]

Attest:

RUTH C. MASON
*Attesting Officer*

C. MARSHALL DANN
*Commissioner of Patents and Trademarks*